US010647366B2

(12) United States Patent
Dyson et al.

(10) Patent No.: US 10,647,366 B2
(45) Date of Patent: May 12, 2020

(54) AUTONOMOUS SURFACE TREATING APPLIANCE

(71) Applicant: Dyson Technology Limited, Wiltshire (GB)

(72) Inventors: James Dyson, Bristol (GB); Peter David Gammack, Swindon (GB); Mark Stamford Vanderstegen-Drake, Gloucester (GB); Paul Joshua Bott, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 333 days.

(21) Appl. No.: 14/267,585

(22) Filed: May 1, 2014

(65) Prior Publication Data
US 2014/0238756 A1    Aug. 28, 2014

Related U.S. Application Data

(63) Continuation of application No. 13/608,648, filed on Sep. 10, 2012, now abandoned.

(30) Foreign Application Priority Data

Sep. 9, 2011  (GB) .................................. 1115603.1

(51) Int. Cl.
*B62D 55/075* (2006.01)
*A47L 9/00* (2006.01)
(Continued)

(52) U.S. Cl.
CPC ............ *B62D 55/075* (2013.01); *A47L 9/009* (2013.01); *B60L 1/003* (2013.01); *B60L 15/2036* (2013.01);
(Continued)

(58) Field of Classification Search
CPC ...................................................... B62D 55/075
(Continued)

(56) References Cited

U.S. PATENT DOCUMENTS

| 1,408,701 A | 3/1922 | Honecker |
| 2,426,342 A | 8/1947 | Couse |

(Continued)

FOREIGN PATENT DOCUMENTS

| CN | 101972128 | 2/2011 |
| CN | 102030047 | 4/2011 |

(Continued)

OTHER PUBLICATIONS

Marsiske, Hans-Arthur. (2010). "Kleine Shritte," *Magazin fuer computer technik* 2010(13): 48-49.

(Continued)

*Primary Examiner* — Marc Carlson
(74) *Attorney, Agent, or Firm* — Morrison & Foerster LLP

(57) ABSTRACT

An autonomous surface treating appliance comprising a chassis having a drive arrangement and a control system interfaced to the drive arrangement so as enable control of the appliance across a surface to be treated, wherein the drive arrangement comprises at least one traction unit, each traction unit comprising a surface-engaging track constrained around a leading wheel and a trailing wheel, the leading wheel and the trailing wheel being arranged so that a track portion opposing the floor surface and extending between the leading and trailing wheels defines a ramped climbing surface.

11 Claims, 13 Drawing Sheets

(51) Int. Cl.
  *B60L 15/20* (2006.01)
  *B60L 1/00* (2006.01)
  *B60L 58/12* (2019.01)
  *B60L 50/52* (2019.01)
  *B60L 53/14* (2019.01)

(52) U.S. Cl.
  CPC .............. *B60L 50/52* (2019.02); *B60L 53/14* (2019.02); *B60L 58/12* (2019.02); *A47L 2201/04* (2013.01); *B60L 2200/40* (2013.01); *B60L 2220/44* (2013.01); *B60L 2240/421* (2013.01); *B60L 2240/423* (2013.01); *B60L 2260/32* (2013.01); *Y02T 10/645* (2013.01); *Y02T 10/705* (2013.01); *Y02T 10/7005* (2013.01); *Y02T 10/7044* (2013.01); *Y02T 10/7072* (2013.01); *Y02T 10/72* (2013.01); *Y02T 10/7275* (2013.01); *Y02T 90/14* (2013.01)

(58) Field of Classification Search
  USPC ................................ 15/319; 180/9, 9.1, 9.32
  See application file for complete search history.

(56) References Cited

U.S. PATENT DOCUMENTS

| | | | |
|---|---|---|---|
| 2,544,774 A | 3/1951 | Bredl et al. | |
| 2,765,860 A | 10/1956 | Church | |
| 3,609,804 A * | 10/1971 | Morrison | 180/9 |
| 3,703,216 A | 11/1972 | Thibodeau | |
| 4,306,329 A | 12/1981 | Yokoi | |
| 4,483,407 A * | 11/1984 | Iwamoto et al. | 180/9.5 |
| 4,598,783 A | 7/1986 | Tippen | |
| 4,782,550 A * | 11/1988 | Jacobs | 15/320 |
| 5,435,031 A | 7/1995 | Minami et al. | |
| 5,507,058 A * | 4/1996 | Minami et al. | 15/1.7 |
| 6,263,989 B1 * | 7/2001 | Won | 180/9.32 |
| 6,481,515 B1 * | 11/2002 | Kirkpatrick et al. | 180/65.1 |
| 6,493,612 B1 * | 12/2002 | Bisset et al. | 701/23 |
| 6,553,612 B1 * | 4/2003 | Dyson et al. | 15/340.1 |
| 6,605,156 B1 * | 8/2003 | Clark et al. | 134/6 |
| 6,748,297 B2 * | 6/2004 | Song et al. | 700/259 |
| 6,818,036 B1 * | 11/2004 | Seaman | 55/426 |
| 6,925,679 B2 * | 8/2005 | Wallach et al. | 15/319 |
| 6,971,141 B1 * | 12/2005 | Tak | 15/340.1 |
| 7,210,192 B2 * | 5/2007 | Ito et al. | 15/327.7 |
| 7,273,115 B2 | 9/2007 | Kummer et al. | |
| 7,316,405 B2 * | 1/2008 | Kritman et al. | 280/5.22 |
| 7,318,248 B1 * | 1/2008 | Yan | 15/319 |
| 7,412,748 B2 * | 8/2008 | Lee et al. | 15/340.1 |
| 7,424,766 B2 * | 9/2008 | Reindle et al. | 15/319 |
| 7,581,282 B2 * | 9/2009 | Woo | 15/319 |
| 7,600,592 B2 * | 10/2009 | Goldenberg et al. | 180/9.1 |
| 7,603,744 B2 * | 10/2009 | Reindle | 15/319 |
| 7,621,014 B2 * | 11/2009 | Katz | 15/1.7 |
| 7,686,861 B2 * | 3/2010 | Oh | 55/429 |
| 7,765,635 B2 * | 8/2010 | Park | 15/319 |
| 7,770,253 B2 * | 8/2010 | Ha et al. | 15/319 |
| 7,908,696 B2 * | 3/2011 | Pareti | 15/1.7 |
| 7,975,790 B2 | 7/2011 | Kim et al. | |
| 8,136,200 B2 * | 3/2012 | Splinter | 15/319 |
| 8,365,848 B2 * | 2/2013 | Won | 180/9.32 |
| 8,371,403 B2 * | 2/2013 | Underwood | 180/9.5 |
| 8,413,752 B2 * | 4/2013 | Page et al. | 180/68.5 |
| 8,417,383 B2 * | 4/2013 | Ozick et al. | 700/258 |
| 8,434,575 B2 * | 5/2013 | Gettings et al. | 180/9.32 |
| 8,752,657 B2 | 6/2014 | Newell | |
| 8,998,215 B2 | 4/2015 | Windorfer | |
| 9,033,079 B2 | 5/2015 | Shin et al. | |
| 2002/0017005 A1 | 2/2002 | Kim et al. | |
| 2004/0026156 A1 | 2/2004 | Hurlburt | |
| 2004/0255425 A1 | 12/2004 | Arai et al. | |
| 2004/0262060 A1 * | 12/2004 | Kim | A47L 9/009 180/65.51 |
| 2005/0217042 A1 * | 10/2005 | Reindle | 15/41.1 |
| 2005/0278888 A1 * | 12/2005 | Reindle et al. | 15/319 |
| 2006/0005344 A1 * | 1/2006 | Uehigashi | 15/319 |
| 2006/0037789 A1 * | 2/2006 | Kritman | A61G 5/061 180/9.32 |
| 2006/0175108 A1 * | 8/2006 | Kubota | 180/196 |
| 2006/0185690 A1 * | 8/2006 | Song et al. | 134/21 |
| 2007/0137905 A1 | 6/2007 | Lee et al. | |
| 2007/0234492 A1 | 10/2007 | Svendsen et al. | |
| 2008/0007117 A1 | 1/2008 | Gonzalez | |
| 2008/0010957 A1 * | 1/2008 | Yun et al. | 55/399 |
| 2008/0238190 A1 | 10/2008 | Kim et al. | |
| 2008/0282494 A1 | 11/2008 | Won et al. | |
| 2008/0307590 A1 | 12/2008 | Jones et al. | |
| 2009/0100630 A1 * | 4/2009 | Kim et al. | 15/319 |
| 2009/0173553 A1 * | 7/2009 | Won | 180/9.32 |
| 2010/0050366 A1 * | 3/2010 | Splinter | 15/319 |
| 2011/0037311 A1 * | 2/2011 | Stolkin et al. | 305/116 |
| 2011/0077802 A1 * | 3/2011 | Halloran et al. | 701/2 |
| 2011/0115173 A1 * | 5/2011 | Gervais | 280/5.22 |
| 2013/0056290 A1 | 3/2013 | Lee et al. | |
| 2013/0061416 A1 * | 3/2013 | Dyson et al. | 15/319 |
| 2013/0087393 A1 * | 4/2013 | Vanderstegen-Drake et al. | 180/9.1 |

FOREIGN PATENT DOCUMENTS

| | | | | |
|---|---|---|---|---|
| EP | 1 502 843 | 2/2005 | | |
| EP | 1 582 132 | 10/2005 | | |
| GB | 2 234 162 | 1/1991 | | |
| GB | 2 403 402 | 1/2005 | | |
| JP | 46-33603 | 11/1971 | | |
| JP | 64-2618 | 1/1989 | | |
| JP | 11-208567 | 8/1999 | | |
| JP | H11208567 A * | 8/1999 | ............ | B62M 27/02 |
| JP | 2001-169619 | 6/2001 | | |
| JP | 2001169619 A * | 6/2001 | ............ | A01C 11/02 |
| JP | 2005-288653 | 10/2005 | | |
| JP | 2007-244722 | 9/2007 | | |
| JP | 2008-110726 | 5/2008 | | |
| JP | 2008110726 A * | 5/2008 | | |
| JP | 2009-518074 | 5/2009 | | |
| KR | 10-0507926 | 8/2005 | | |
| KR | 10-0780336 | 11/2007 | | |
| WO | WO-00/38025 | 6/2000 | | |
| WO | WO-03/049664 | 6/2003 | | |
| WO | WO-2005/116370 | 12/2005 | | |
| WO | WO-2008/009886 | 1/2008 | | |
| WO | WO-2008/105948 | 9/2008 | | |

OTHER PUBLICATIONS

Search Report dated Dec. 21, 2011, directed to GB Application No. 1115603.1; 1 page.
Search Report dated Oct. 26, 2012, directed to International Application No. PCT/GB2012/052058; 10 pages.
Search Report dated Apr. 3, 2013, directed to GB Application No. 1303633.0; 1 page.
Dyson et al., U.S. Office Action dated Jun. 6, 2013, directed to U.S. Appl. No. 13/608,648; 18 pages.
Dyson et al., U.S. Office Action dated Nov. 29, 2013, directed to U.S. Appl. No. 13/608,648; 23 pages.
Vanderstegen-Drake et al., U.S. Office Action dated Nov. 22, 2013, directed to U.S. Appl. No. 13/608,656; 7 pages.
Vanderstegen-Drake et al., U.S. Office Action dated Apr. 16, 2014, directed to U.S. Appl. No. 13/608,656; 7 pages.
Dyson et al., U.S. Office Action dated May 22, 2014, directed to U.S. Appl. No. 13/608,648; 15 pages.
Andrew Girson, "High-Mobility Tactical Micro-Robot Enters the Field with InHand's Fingertip Technology"—Information Quarterly, vol. 1, No. 1, 2002, pp. 54-55.
Explorations—Winter 2005 with Draper Mobile Robotic Vehicle on Cover; pp. 2 and 4.
Dyson et al., U.S. Office Action dated Dec. 4, 2014, directed to U.S. Appl. No. 13/608,648; 17 pages.

(56) References Cited

OTHER PUBLICATIONS

Vanderstegen-Drake et al., U.S. Office Action dated Oct. 5, 2015, directed to U.S. Appl. No. 13/608,656; 8 pages.
Ge et al. (2009). "Structural Analysis of Track Robot's Running System," Mechanical Manufacturing 47 (540): 37-38.
Observation on the Request for Invalidation dated Sep. 27, 2019, directed to CN Patent No. 102987987; 94 pages.
Vanderstegen-Drake et al., U.S. Office Action dated Aug. 17, 2017, directed to U.S. Appl. No. 13/608,656; 13 pages.
Vanderstegen-Drake et al., U.S. Office Action dated Feb. 25, 2019, directed to U.S. Appl. No. 13/608,656; 9 pages.
Vanderstegen-Drake et al., U.S. Office Action dated Jan. 30, 2017, directed to U.S. Appl. No. 13/608,656; 12 pages.
Vanderstegen-Drake et al., U.S. Office Action dated Jul. 26, 2018, directed to U.S. Appl. No. 13/608,656; 11 pages.
Vanderstegen-Drake et al., U.S. Office Action dated May 20, 2016, directed to U.S. Appl. No. 13/608,656; 10 pages.

\* cited by examiner

AUTONOMOUS SURFACE TREATING APPLIANCE

REFERENCE TO RELATED APPLICATIONS

This application is a continuation of U.S. patent application Ser. No. 13/608,648, filed Sep. 10, 2012, which claims the priority of United Kingdom Application No. 1115603.1, filed Sep. 9, 2011, the entire contents of which are incorporated herein by reference.

FIELD OF THE INVENTION

This invention relates to an autonomous surface treating appliance, such as a mobile robotic vacuum cleaner, and also to a drive arrangement for such a machine.

BACKGROUND OF THE INVENTION

Mobile robots are increasingly commonplace and are used in such diverse fields as space exploration, lawn mowing and floor cleaning. The last decade has seen particularly rapid advancement in the field of robotic floor cleaning devices, especially vacuum cleaners, the primary objective of which is to navigate a user's home autonomously and unobtrusively whilst cleaning the floor. The invention will be described in the context of a robotic vacuum cleaner but it is also applicable in general to any type of mobile robot platform, such as robotic lawn mowers.

Common to all mobile robots is the requirement for a drive system. In the context of robotic floor cleaners, a popular approach is to provide the robot body with wheel on each side, each wheel being drivable independently. Therefore, the robot can move linearly by driving both wheels in the same direction at the same speed or can turn by varying the relative rotation of the wheels. Driving both wheels in opposite direction enables the robot to rotate on the spot. Such a system usually will also include a third wheel positioned towards the rear of the robot body which acts as a caster, passively rolling along whilst providing a support for one side of the body. A significant advantage of such a system is that it makes the robot highly maneuverable and also avoids the need for an additional steering mechanism. Examples of autonomous robotic vacuum cleaners using such a drive arrangement are Roomba™ by iRobot and Trilobite™ by Electrolux.

A disadvantage of the wheeled mobile robot as described above is its limited ability to climb over objects, or even over or onto floor coverings such as cables or rugs.

An alternative approach is to equip an autonomous floor cleaner with a tracked drive arrangement, as shown in European patent application no. EP1582132. Such an arrangement tends to improve grip due to the larger contact patch inherent with a track and so it may be better at negotiating obstacles such as rugs and cables. However, due to the increased contact patch the robot drive system is more susceptible to slippage which is a disadvantage because it introduces inaccuracies into the navigation system of the robot.

SUMMARY OF THE INVENTION

Against this background, the invention provides an autonomous surface treating appliance comprising a chassis having a drive arrangement and a control system interfaced to the drive arrangement so as enable control of the appliance across a surface to be treated, wherein the drive arrangement comprises at least one traction unit, each traction unit comprising a surface-engaging track constrained around a leading wheel and a trailing wheel, the leading wheel and the trailing wheel being arranged so that a track portion opposing the floor surface and extending between the leading and trailing wheels defines a ramped climbing surface.

Expressed another way, the invention resides in a drive arrangement for a mobile robot comprising a transmission unit for transmitting drive from a motor unit to a drive shaft extending from the transmission unit along a drive shaft axis, a swing arm coupled to the transmission unit so as to swing angularly about an axis of the drive shaft, a sprocket mounted to the drive shaft and a pulley mounted on a portion of the swing arm remote from the drive shaft and being rotatable about an axis parallel to the drive shaft axis, a track constrained around the sprocket and the pulley, wherein the sprocket and the pulley are arranged such that the track presents an inclined driving surface.

This ramped climbing surface relative to the adjacent surface to be treated improves the ability of the robot to climb over imperfections in the surface to be treated, as well as over raised obstacles such as electrical cables/flexes or edges of rugs for example. Moreover, due to the portion of the track forward of the trailing wheel, which is inclined relative to the horizontal, a small contact patch is maintained which provides a maneuvering benefit since it does not suffer the extent of slippage that would be experienced if a significant portion of the track was in contact with the floor surface. This is particularly true on carpeted surfaces where an elongate contact patch as exemplified by known tank-track configurations makes it difficult for a robot to turn on the spot. In contrast to this, the mobile robot of the invention is provided with the climbing advantages of a tracked climbing surface and the maneuvering advantages of a small contact patch in the same way as a plain wheel.

In order to drive the traction units, there may be provided a motor that, in one embodiment, drives the leading wheel in response to commands from the control system. However, it should be appreciated that the trailing wheel may also be the driven wheel.

For simplicity and cost, the motor is an electric motor and, more specifically, a brushless DC motor. Other motor drives are possible such as a hydraulic motor drive, albeit at increased cost and weight.

Although the leading wheel may be driven directly by the motor, in the exemplary embodiment a transmission unit is provided to transmit drive from the motor to the leading wheel. The enables the speed of the motor to be down-geared whilst increasing torque and ensuring control accuracy.

The transmission also provides a mounting portion by which the traction unit may be mountable to the chassis of the appliance whilst also providing a fixed point on which a linkage member may be pivotably mounted at one end, and having a second end to which the trailing wheel is mounted. The trailing wheel may therefore swing angularly about the drive axis of the leading wheel.

When travelling over rough surfaces, for example thick pile carpet, improved traction is required. Thus, in an enhancement of the drive arrangement, biasing means is provided intermediate the transmission case and the linkage member which urges the trailing wheel towards the surface to be treated. Thus, if the chassis is cause to raise due to contact with an obstacle or surface feature, the trailing wheel will be urged into contact with the surface therefore maintaining strong traction.

In order to prevent objects from fouling the tracks the linkage member may include a guard member that at least partially fills a volume bounded by the leading wheel, the trailing wheel and the inner surfaces of the track. This reduces the likelihood that objects such as grit or stones will enter the nip between the track and the wheels, therefore improving the reliability of the traction units.

A further traction enhancement is provided by the configuration of the trailing wheel. The trailing wheel may rim portion adjacent to and having a larger diameter than a track engaging surface of the trailing wheel. Optionally, the rim portion may extend to the same radial position as the outer surface of the track and may be provided with a smooth or serrated profile. In this embodiment, since the rim portion extends to a radium comparable with the track radius, in circumstances in which robot is travelling over a soft surface such as a rug or carpet, the track will tend to sink into the pile of the carpet whereby the serrated edge of the rim portion will tend to engage the carpet and provide the robot with increased traction. However, on hard surfaces, only the track will contact the floor surface which will benefit the maneuvering ability of the robot.

Although the invention applies to mobile robots and autonomous floor treating appliances in general, is has particularly utility in robotic vacuum cleaners comprising an airflow generator for generating a flow of air between a dirty air inlet and a clean air outlet, and a separating apparatus disposed in the airflow path between the dirty air inlet and the clean air outlet so as to separate dirt from the airflow.

BRIEF DESCRIPTION OF THE DRAWINGS

In order that the invention may be more readily understood, reference will now be made, by way of example only, to the accompanying drawings in which.

DETAILED DESCRIPTION OF THE INVENTION

Figure 1:
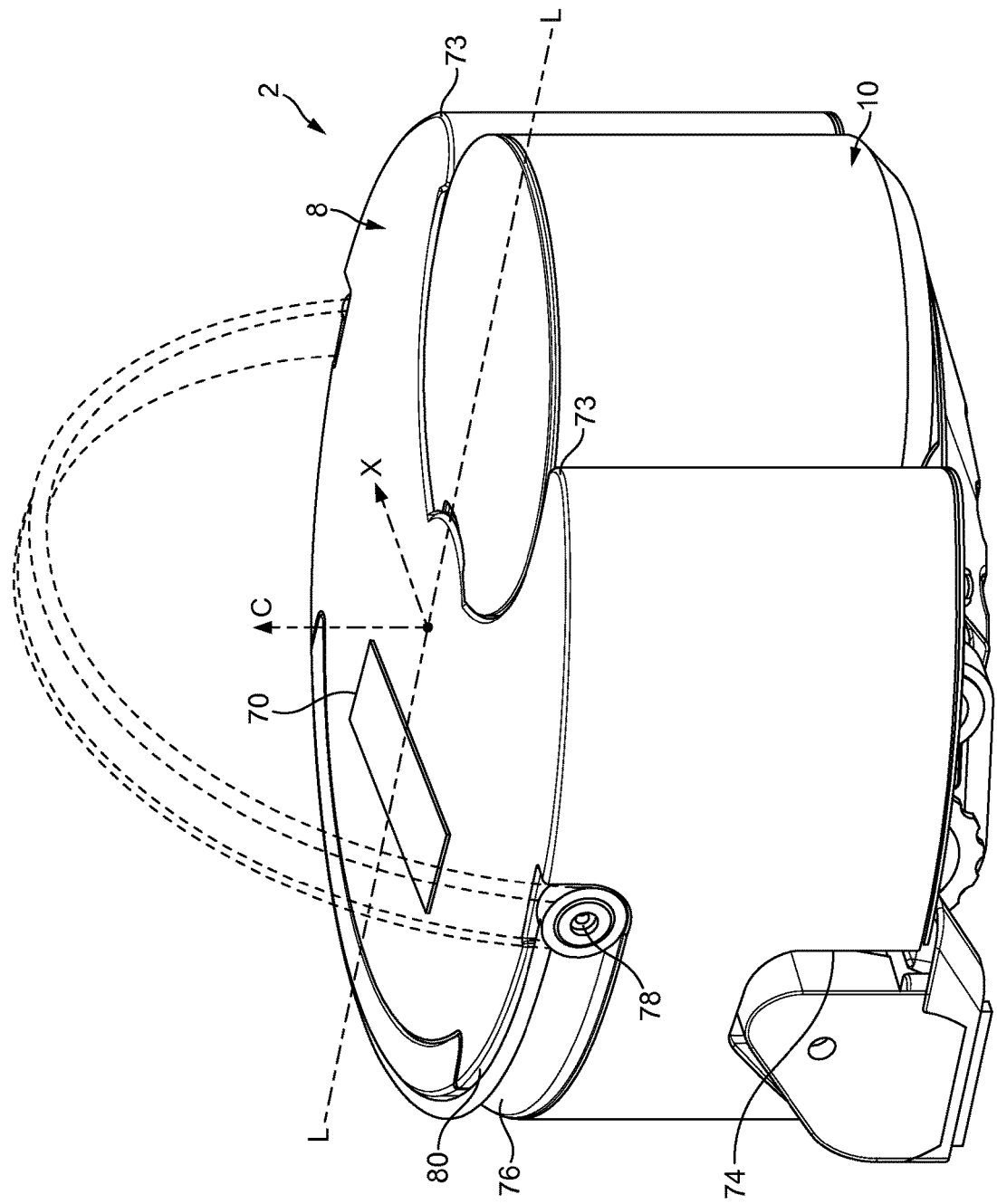
FIG. 1 is a front perspective view of a mobile robot in accordance with an embodiment of the invention.

With reference to FIGS. 1, 2, 3, 4 and 5 of the drawings, an autonomous surface treating appliance in the form of a robotic vacuum cleaner 2 (hereinafter 'robot') comprises has a main body having four principal assemblies: a chassis (or sole plate) 4, a body 6 which is carried on the chassis 4, a generally circular outer cover 8 which is mountable on the chassis 4 and provides the robot 2 with a generally circular profile, and a separating apparatus 10 that is carried on a forward part of the body 6 and which protrudes through a complementary shaped cut-out 12 of the outer cover 8.

For the purposes of this specification, the terms 'front' and 'rear' in the context of the robot will be used in the sense of its forward and reverse directions during operation, with the separating apparatus 10 being positioned at the front of the robot. Similarly, the terms 'left' and 'right' will be used with reference to the direction of forward movement of the robot. As will be appreciated from FIG. 1, the main body of the robot 2 has the general form of a relatively short circular cylinder, largely for maneuverability reasons, and so has a cylindrical axis 'C' that extends substantially vertically relative to the surface on which the robot travels. Accordingly, the cylindrical axis C extends substantially normal to a longitudinal axis of the robot 'L' that is oriented in the fore-aft direction of the robot 2 and so passes through the centre of the separating apparatus 10. The diameter of the main body is preferably between 200 mm and 300 mm, and more preferably between 220 mm and 250 mm. Most preferably, the main body has a diameter of 230 mm which has been found to be a particularly effective compromise between maneuverability and cleaning efficiency.

The chassis 4 supports several components of the robot 2 and is preferably manufactured from a high-strength injection moulded plastics material, such as ABS (Acrylonitrile Butadiene Styrene), although it could also be made from appropriate metals such as aluminium or steel, or composite materials such a carbon fibre composite. As will be explained, the primary function of the chassis 4 is as a drive platform and to carry cleaning apparatus for cleaning the surface over which the robot travels.

Figure 2:
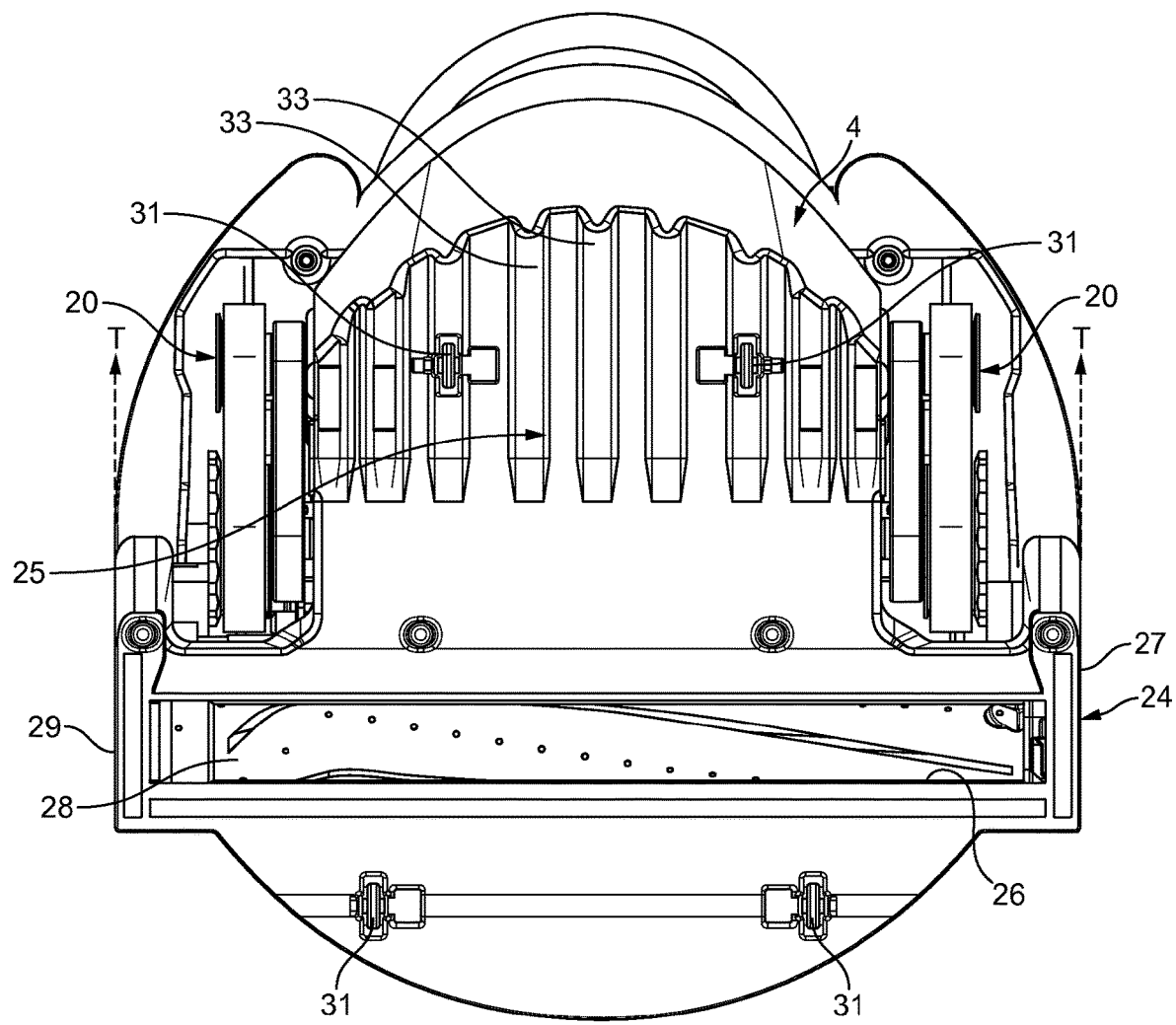
FIG. 2 is a view from beneath of the mobile robot in FIG. 1.
Figure 3:
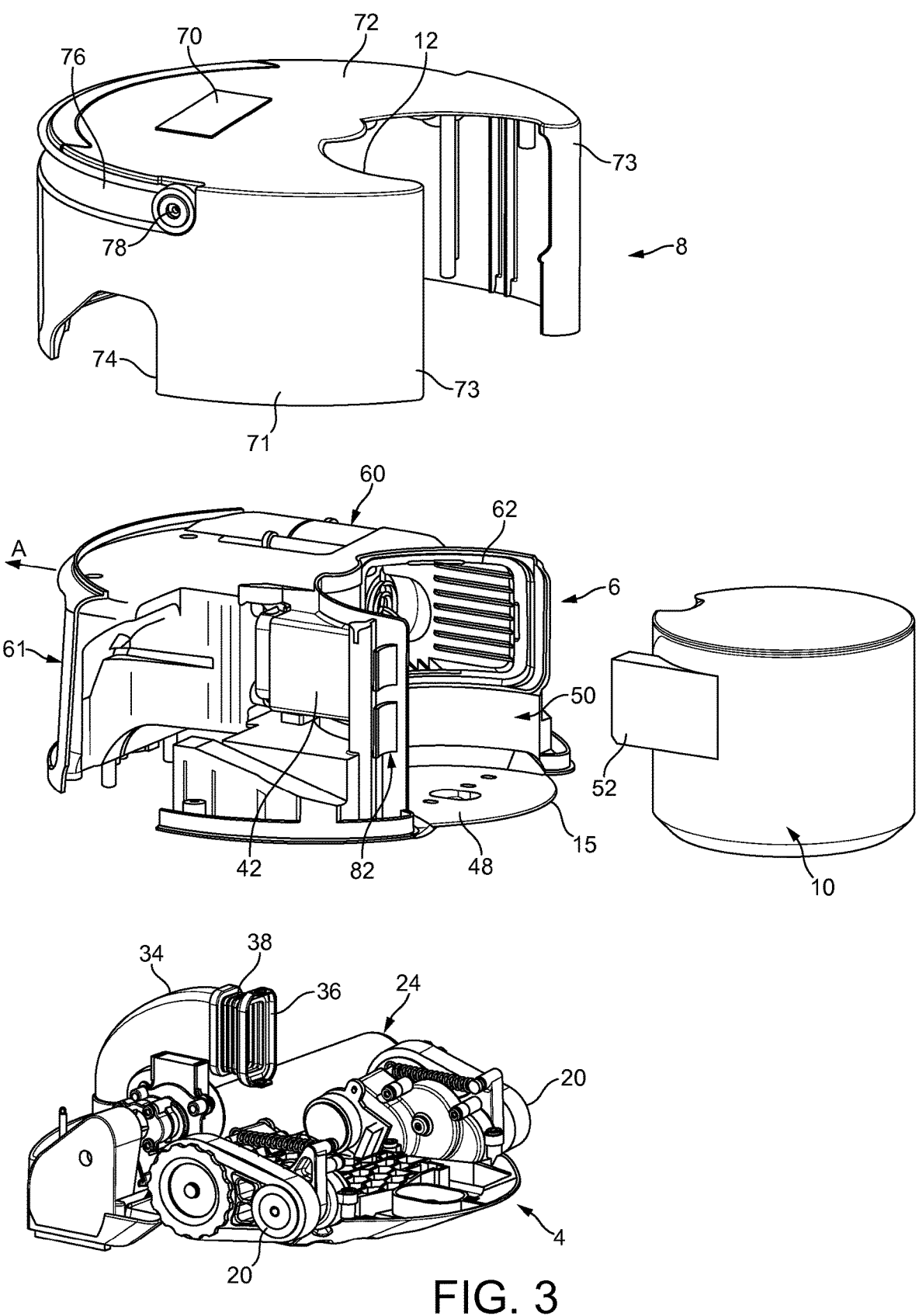
FIG. 3 is an exploded perspective view of the mobile robot of the invention showing its main assemblies.
Figure 4:
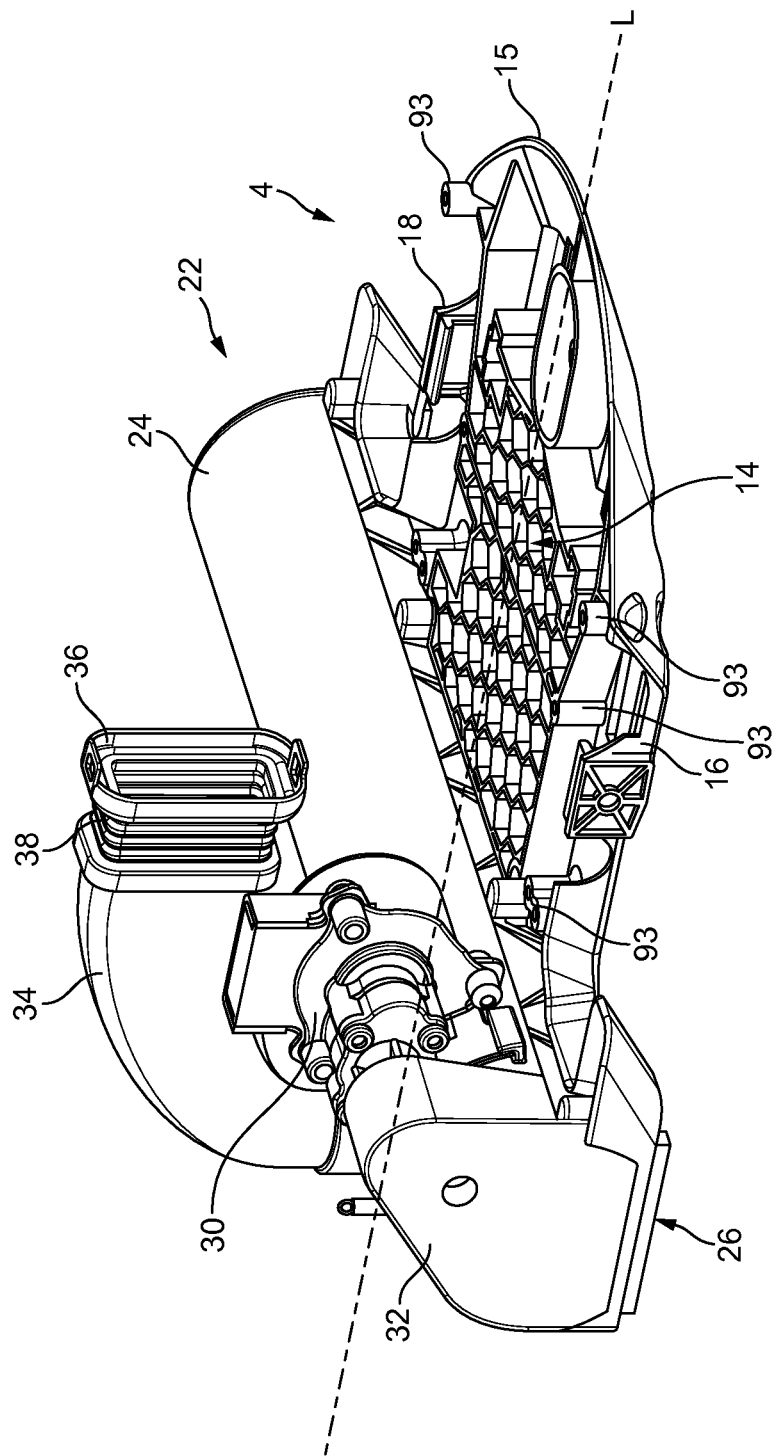
FIG. 4 is a front perspective view of the chassis of the mobile robot.
Figure 5A:
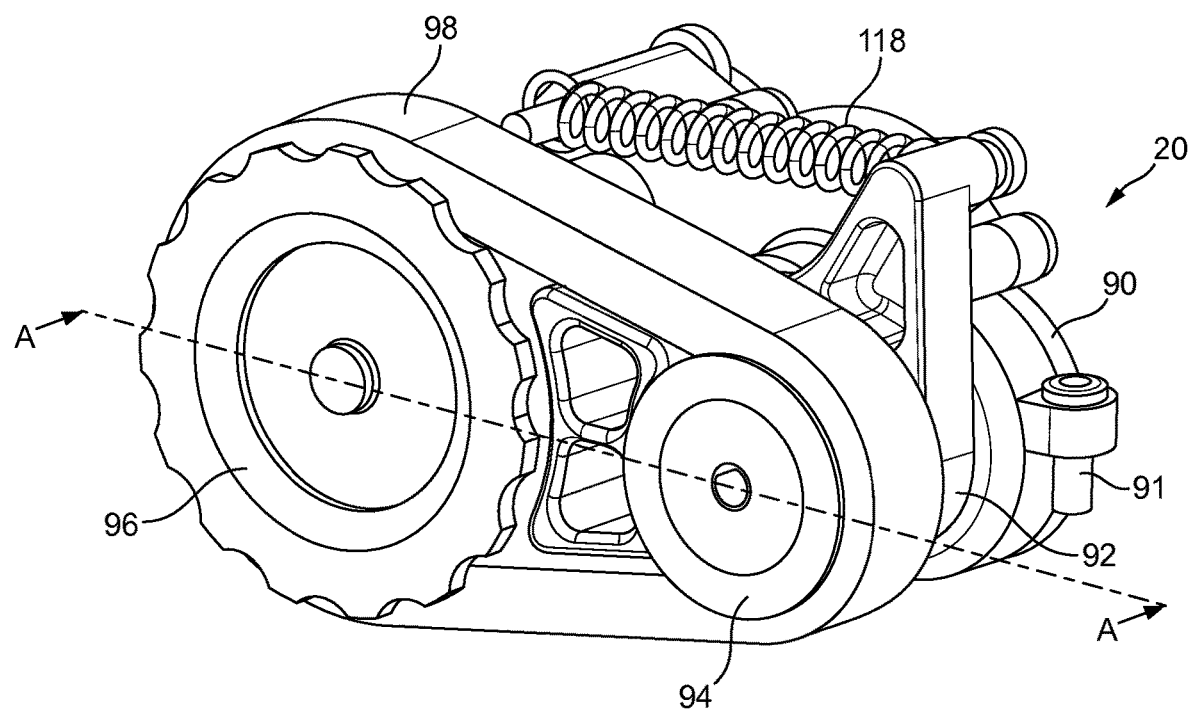
FIGS. 5a and 5b are perspective views from either side of a traction unit of the mobile robot.
Figure 5B:
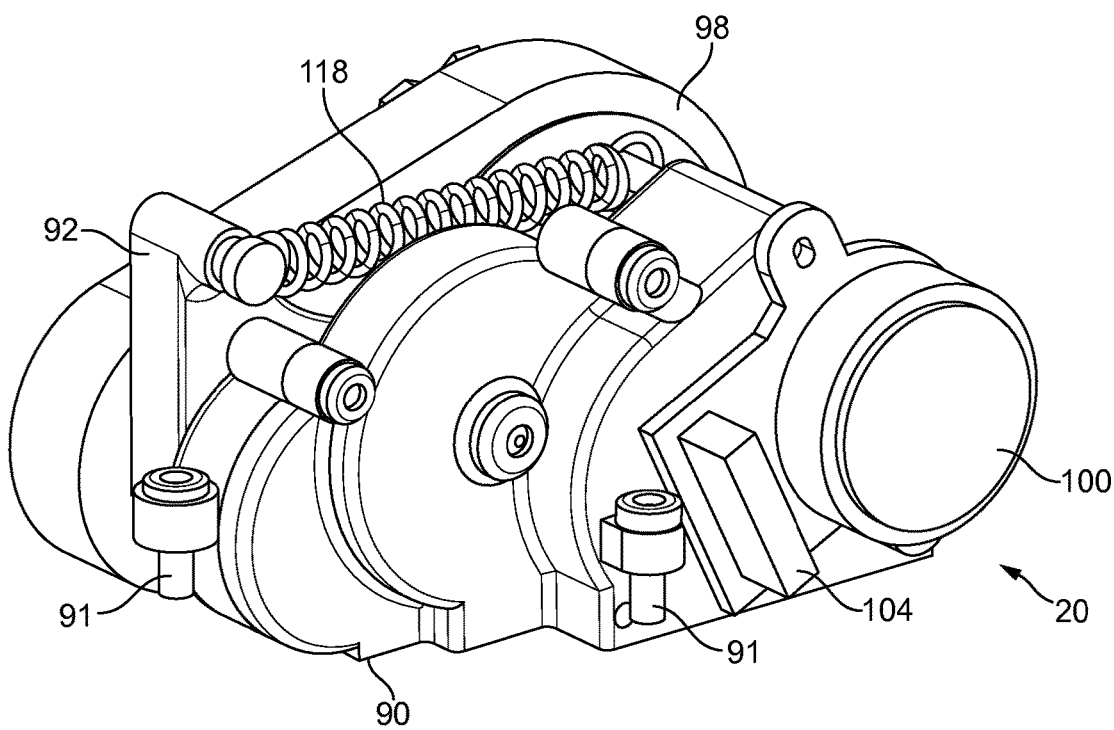

With particular reference to FIGS. 3 and 4, a front portion 14 of the chassis 4 is relatively flat and tray-like in form and defines a curved prow 15 that forms the front of the robot 2. Each flank of the front portion 14 of the chassis has a recess 16, 18 in which recesses a respective traction unit 20 is mountable. Note that FIGS. 2 and 3 shows the chassis 4 with the traction units 20 attached and FIG. 4 shows the chassis 4 without the traction units 20 attached.

The pair of traction units 20 are located on opposite sides of the chassis 4 and are operable independently to enable to robot to be driven in forward and reverse directions, to follow a curved path towards the left or right, or to turn on the spot in either direction, depending on the speed and direction of rotation of the traction units 20. Such an arrangement is sometimes known as a differential drive, and detail of the traction units 20 will be described more fully later in the specification.

The relatively narrow front portion 14 of the chassis 4 widens into rear portion 22 which includes a cleaner head 24 having a generally cylindrical form and which extends transversely across substantially the entire width of the chassis 4 relative to its longitudinal axis 'L'.

With reference also to FIG. 2, which shows the underside of the robot 2, the cleaner head 24 defines a rectangular suction opening 26 that faces the supporting surface and into which dirt and debris is drawn into when the robot 2 is operating. An elongate brush bar 28 is contained within the cleaner head 24 and is driven by an electric motor 30 via a reduction gear and drive belt arrangement 32 in a conventional manner, although other drive configurations such as a solely geared transmission are also envisaged.

The underside of the chassis 4 features an elongate sole plate section 25 extending forward of the suction opening 26 defining a ramped nose at its forward edge. A plurality of channels 33 (only two of which are labeled for brevity) on the sole plate provide pathways for dirty air being drawn towards the suction opening 26. The underside of the chassis 4 also carries a plurality (four in the illustrated embodiment) of passive wheel or rollers 31 which provide further bearing points for the chassis 4 when it is at rest on or moving over a floor surface. It should be noted that the rollers 31 support the chassis such that the underside thereof is in a parallel orientation relative to a floor surface. Furthermore, although wheels or rollers are preferred, they could also be embodied as hard bearing points such as skids or runners.

In this embodiment, the cleaner head 24 and the chassis 4 are a single plastics moulding, thus the cleaner head 24 is integral with the chassis 4. However, this need not be the case and the two components could be separate, the cleaner head 24 being suitably affixed to the chassis 4 as by screws or an appropriate bonding technique as would be clear to the skilled person.

The cleaner head 24 has first and second end faces 27, 29 that extend to the edge of the chassis 4 and which are in line with the cover 8 of the robot. Considered in horizontal or plan profile as in FIGS. 2 and 3, it can be seen that the end faces 27, 29 of the cleaner head 24 are flat and extend at a tangent (labeled as 'T') to the cover 8 at diametrically opposed points along the lateral axis 'X' of the robot 2. The benefit of this is that the cleaner head 24 is able to run extremely close to the walls of a room as the robot traverses in a 'wall following' mode therefore being able to clean right up to the wall. Moreover, since the end faces 27, 29 of the cleaner head 24 extend tangentially to both sides of the robot 2, it is able to clean right up to a wall whether the wall is on the right side or the left side of the robot 2. It should be noted, also, that the beneficial edge cleaning ability is enhanced by the traction units 20 being located inboard of the cover 8, and substantially at the lateral axis 'X' meaning that the robot can maneuver in such a way that the cover 8 and therefore also the end faces 27, 29 of the cleaner head 24 are almost in contact with the wall during a wall following operation.

Dirt drawn into the suction opening 26 during a cleaning operation exits the cleaner head 24 via a conduit 34 which extends upwardly from the cleaner head 24 and curves towards the front of the chassis 4 through approximately 90° of arc until it faces in the forwards direction. The conduit 34 terminates in a rectangular mouth 36 having a flexible bellows arrangement 38 shaped to engage with a complementary shaped duct 42 provided on the body 6.

The duct 42 is provided on a front portion 46 of the body 6, and opens into a forward facing generally semi-cylindrical recess 50 having a generally circular base platform 48. The recess 50 and the platform 48 provide a docking portion into which the separating apparatus 10 is mounted, in use, and from which it can be disengaged for emptying purposes.

It should be noted that in this embodiment the separating apparatus 10 consists of a cyclonic separator such as disclosed in WO2008/009886, the contents of which are incorporated herein by reference. The configuration of such separating apparatus is well known and will not be described any further here, save to say that the separating apparatus may be removably attached to the body 6 by a suitable mechanism such as a quick-release fastening means to allow the apparatus 10 to be emptied when it becomes full. The nature of the separating apparatus 10 is not central to the invention and the cyclonic separating apparatus may instead separate dirt from the airflow by other means that are known in the art for example a filter-membrane, a porous box filter or some other form of separating apparatus. For embodiments of the apparatus which are not vacuum cleaners, the body can house equipment which is appropriate to the task performed by the machine. For example, for a floor polishing machine the main body can house a tank for storing liquid wax.

When the separating apparatus 10 is engaged in the docking portion 50, a dirty air inlet 52 of the separating apparatus 10 is received by the duct 42 and the other end of the duct 42 is connectable to the mouth 36 of the brush bar conduit 34, such that the duct 42 transfers the dirty air from the cleaner head 24 to the separating apparatus 10. The bellows 38 provide the mouth 36 of the duct 34 with a degree of resilience so that it can mate sealingly with the dirty air inlet 52 of the separating apparatus 10 despite some angular misalignment. Although described here as bellows, the duct 34 could also be provided with an alternative resilient seal, such as a flexible rubber cuff seal, to engage the dirty air inlet 52.

Dirty air is drawn through the separating apparatus 10 by an airflow generator which, in this embodiment, is an electrically powered motor and fan unit (not shown), that is located in a motor housing 60 located on the left hand side of the body 6. The motor housing 60 includes a curved inlet mouth 62 that opens at the cylindrical shaped wall of docking portion 50 thereby to match the cylindrical curvature of the separating apparatus 10. Although not seen in FIG. 4, the separating apparatus 10 includes a clean air outlet which registers with the inlet mouth 62 when the separating apparatus 10 is engaged in the docking portion 50. In use, the suction motor is operable to create low pressure in the region of the motor inlet mouth 62, thereby drawing dirty air along an airflow path from the suction opening 26 of the cleaner head 24, through the conduit 34 and duct 42 and through the separating apparatus 10 from dirty air inlet 52 to the clean air outlet. Clean air then passes through the motor housing 60 and is exhausted from the rear of the robot 2 through a filtered clean air outlet 61.

The cover 8 is shown separated from the body 6 in FIG. 3 and fixed to it in FIG. 1. Since the chassis 4 and body 6 carry the majority of the functional components of the robot, the cover 8 provides an outer skin that serves largely as a protective shell and to carry a user control interface 70.

The cover 8 comprises a generally cylindrical side wall 71 and a flat upper surface 72 which provides a substantially circular profile corresponding to the plan profile of the body 6, save for the part-circular cut-out 12 shaped to complement the shape of the docking portion 50, and the cylindrical separating apparatus 10. Furthermore, it can be seen that the flat upper surface 72 of the cover 8 is co-planar with an upper surface 10a of the separating apparatus 10, which therefore sits flush with the cover 8 when it is mounted on the main body.

As can be seen particularly clearly in FIGS. 1 and 3, the part-circular cut-out 12 of the cover 8 and the semi-cylindrical recess 50 in the body 6 provides the docking portion a horseshoe shaped bay defining two projecting lobes or arms 73 which flank either side of the separating apparatus 10 and leave between approximately 5% and 40%, and preferably 20%, of the apparatus 10 protruding from the front of the docking portion 50. Therefore, a portion of the separating apparatus 10 remains exposed even when the cover 8 is in place on the main body of the robot 2, which enables a user ready access to the separating apparatus 10 for emptying purposes.

Opposite portions of the side wall 71 include an arched recess 74 (only one shown in FIG. 3) that fits over a respective end 27, 29 of the cleaner head 24 when the cover 8 is connected to the body 6. As can be seen in FIG. 1, a clearance exists between the ends of the cleaner head 24 and the respective arches 74 order to allow for relative movement therebetween in the event of a collision with an object.

On the upper edge of the side wall 71, the cover 8 includes a semi-circular carrying handle 76 which is pivotable about two diametrically opposite bosses 78 between a first, stowed position, in which the handle 76 fits into a complementary shaped recess 80 on upper peripheral edge of the cover 8, and a deployed position in which it extends upwardly, (shown ghosted in FIG. 1). In the stowed position, the handle maintains the 'clean' circular profile of the cover 8 and is unobtrusive to the use during normal operation of the robot 2. Also, in this position the handle serves to lock a rear filter door (not shown) of the robot into a closed position which prevents accidental removal of the filter door when the robot 2 is operating.

In operation, the robot 2 is capable of propelling itself about its environment autonomously, powered by a rechargeable battery pack (not shown). To achieve this, the robot 2 carries an appropriate control means which is interfaced to the battery pack, the traction units 20 and an appropriate sensor suite 82 comprising for example infrared and ultrasonic transmitters and receivers on the front left and right side of the body 6. The sensor suite 82 provides the control means with information representative of the distance of the robot from various features in an environment and the size and shape of the features. Additionally the control means is interfaced to the suction fan motor and the brush bar motor in order to drive and control these components appropriately. The control means is therefore operable to control the traction units 20 in order to navigate the robot 2 around the room which is to be cleaned. It should be noted that the particular method of operating and navigating the robotic vacuum cleaner is not material to the invention and that several such control methods are known in the art. For example, one particular operating method is described in more detail in WO00/38025 in which navigation system a light detection apparatus is used. This permits the cleaner to locate itself in a room by identifying when the light levels detected by the light detector apparatus is the same or substantially the same as the light levels previously detected by the light detector apparatus.

Having described the chassis 4, body 6 and cover 8, the traction units 20 will now be described in further detail with reference to FIGS. 5 to 9 which show various perspective, sectional, and exploded views of a single traction unit 20 for clarity.

In overview, the traction unit 20 comprises a transmission case 90, a linkage member 92 or 'swing arm', first and second pulley wheels 94, 96, and a track or continuous belt 98 that is constrained around the pulley wheels 94, 96.

The transmission case 90 houses a gear system which extends between an input motor drive module 100 mounted on an in-board side of one end of the transmission case 90, and an output drive shaft 102 that protrudes from the drive side of the transmission case 90, that is to say from the other side of the transmission case 90 to which the motor module 100 is mounted. The motor module 100 in this embodiment is a brushless DC motor since such a motor is reliable and efficient, although this does not preclude other types of motors from being used, for example brushed DC motors, stepper motors or even hydraulic drives. As has been mentioned, the motor module 100 is interfaced with the control means to receive power and control signals and is provided with an integral electrical connector 104 for this purpose. The gear system in this embodiment is a gear wheel arrangement which gears down the speed of the motor module 100 whilst increasing available torque, since such a system is reliable, compact and lightweight. However, other gearing arrangements are envisaged within the context of the invention such as a belt or hydraulic transmission arrangement.

The traction unit 20 therefore brings together the drive, gearing and floor engaging functions into a self-contained and independently driven unit and is readily mounted to the chassis 4 by way of a plurality of fasteners 91 (four fasteners in this embodiment), for example screws or bolts, that are received into corresponding mounting lugs 93 defined around the recess of the chassis 4.

The traction unit 20 is mountable to the chassis so that the first pulley wheel 94 is in a leading position when the robot 2 is traveling forwards. In this embodiment, the lead wheel 94 is the driven wheel and includes a centre bore 104 which is receivable onto the drive shaft 102 by way of a press fit. The leading wheel 94 may also be termed a sprocket since it is the driven wheel in the pair. In order to improve the transfer of drive force from the drive shaft 102 to the lead wheel 94, the centre bore 104 of the pulley wheel may be internally keyed to mate with a corresponding external key on the drive shaft. Alternative ways of securing the pulley wheel to the shaft are also envisaged, such as a part-circular clip ('circlip') attached to the shaft.

The swing arm 92 includes a leading end that is mounted to the transmission case 90 between it and the lead wheel 94 and is mounted so as to pivot about the drive shaft 102. A bush 106 located in a mounting aperture 108 of the swing arm 92 is received on an outwardly projecting spigot 110 of the transmission case 90 through which the drive shaft 102 protrudes. The bush 106 therefore provides a bearing surface intermediate the spigot 110 and the swing arm 92 to allow the swing arm 92 to pivot smoothly and to prevent splaying relative to the transmission case 90. The bush 106 is made preferably from a suitable engineering plastics such as polyamide which provides the required low friction surface yet high strength. However, the bush 106 may also be made out of metal such as aluminum, steel, or alloys thereof, which would also provide the necessary frictional and strength characteristics.

As shown in the assembled views, the swing arm 92 is mounted on the spigot 110 and the lead wheel 94 is mounted to the drive shaft 102 outboard of the leading end of the swing arm 92. A stub axle 112 is press fit into a bore located on the opposite or 'trailing' end of the swing arm 92 and defines a mounting shaft for the rear pulley wheel 96, or 'trailing wheel' along a rotational axis parallel to the axis of the drive shaft 102. The trailing wheel 96 includes a centre bore 113 in which a bearing bush 114 is received in a press fit. The bush 114 is received over the axle 112 in a sliding fit so that the bush, and therefore also the trailing wheel 96, are rotatable relative to the swing arm 92. A circlip 116 secures the trailing wheel to the axle 112.

The continuous belt or track 98 provides the interface between the robot 2 and the floor surface and, in this embodiment, is a tough rubberized material that provides the robot with high grip as the robot travels over the surface and negotiates changes in the surface texture and contours. Although not shown in the figures, the belt 98 may be provided with a tread pattern in order to increase traction over rough terrain.

Similarly, although not shown in the figures, the inner surface 98a of the belt 98 is serrated or toothed so as to engage with a complementary tooth formation 94a provided on the circumferential surface of the leading wheel 94 which reduces the likelihood of the belt 98 slipping on the wheel 94. In this embodiment, the trailing wheel 96 does not carry a complementary tooth formation, although this could be provided if desired. To guard against the belt 98 slipping off the trailing wheel 96, circumferential lips 96a, 96b are provided on its inner and outer rims. As for the leading wheel 94, a circumferential lip 94b is provided on only its outer rim since the belt 98 cannot slip off the inner rim due to the adjacent portion of the swing arm 92.

As will be appreciated, the swing arm 92 fixes the leading and trailing wheels 94, 96 in a spaced relationship and permits the trailing wheel 96 to swing angularly about the leading wheel 94. The maximum and minimum limits of angular travel of the swing arm 92 are defined by opposed arch-shaped upper and lower stop members 122a, 122b that protrude from the drive side of the transmission case 90. A stub or pin 124 extending from the in-board side of the swing arm 92 is engagable with the stops 122a, 122b to delimit the travel of the swing arm 92.

Figure 9:
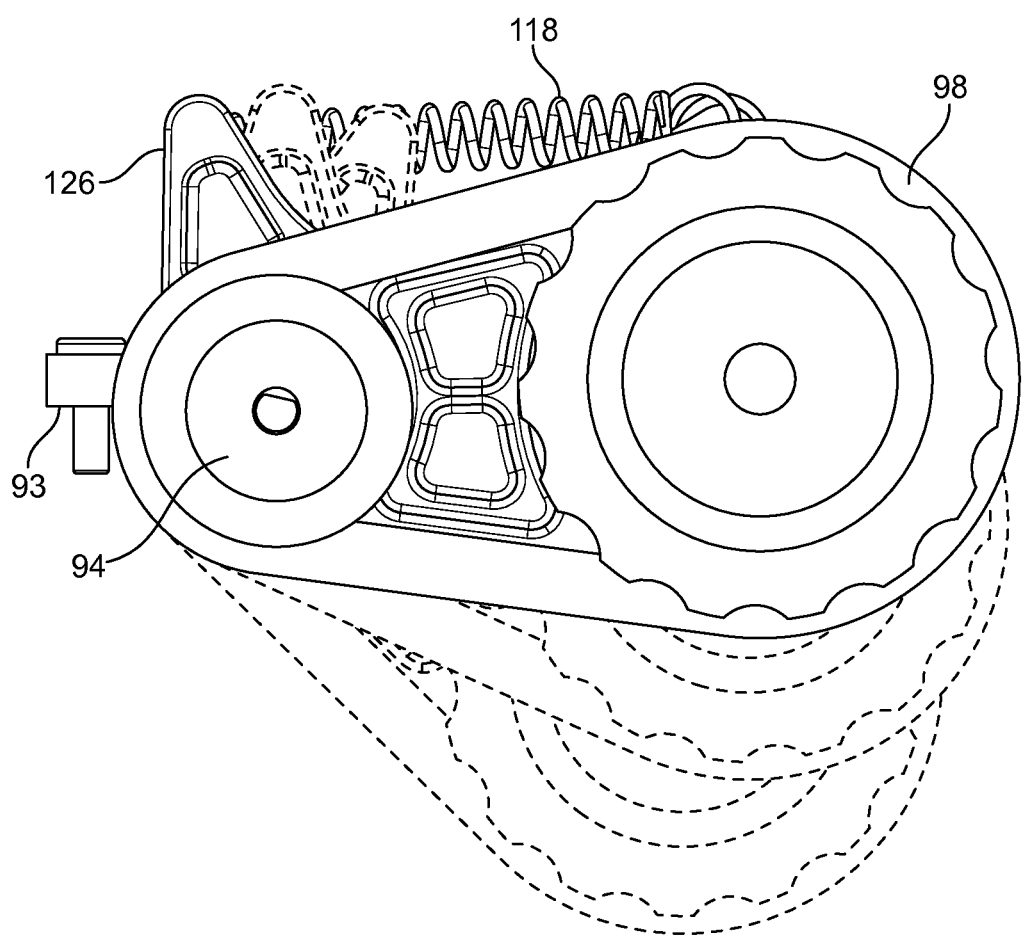
FIG. 9 is a side view of the traction unit in FIG. 6, but shown in three swing arm positions.

The traction unit 20 also comprises swing arm biasing means in the form of a coil spring 118 that is mounted in tension between a mounting bracket 126 extending upwardly from the leading portion of the swing arm 92 and a pin 128 projecting from the trailing portion of the transmission case 90. The spring 118 acts to bias the trailing wheel 96 into engagement with the floor surface, in use, and this improves traction when the robot 2 is negotiating an uneven surface such as a thick-pile carpet or climbing over obstacles such as electrical cables. FIG. 9 shows three exemplary positions of the traction unit 20 throughout the range of movement of the swing arm 92.

In the exemplary embodiment, when the robot 2 is sitting on a surface the swing arm 92 is in its 'minimum travel position' such that the pin 124 is engaged with the upper stop 122a and the spring 118 acts in tension so as to urge the trailing wheel 96 downwards purely to improve traction. However, it should be appreciated that a stronger spring 118 could also be used such that the robot would be suspended on the traction units when placed on a surface.

Figure 6:
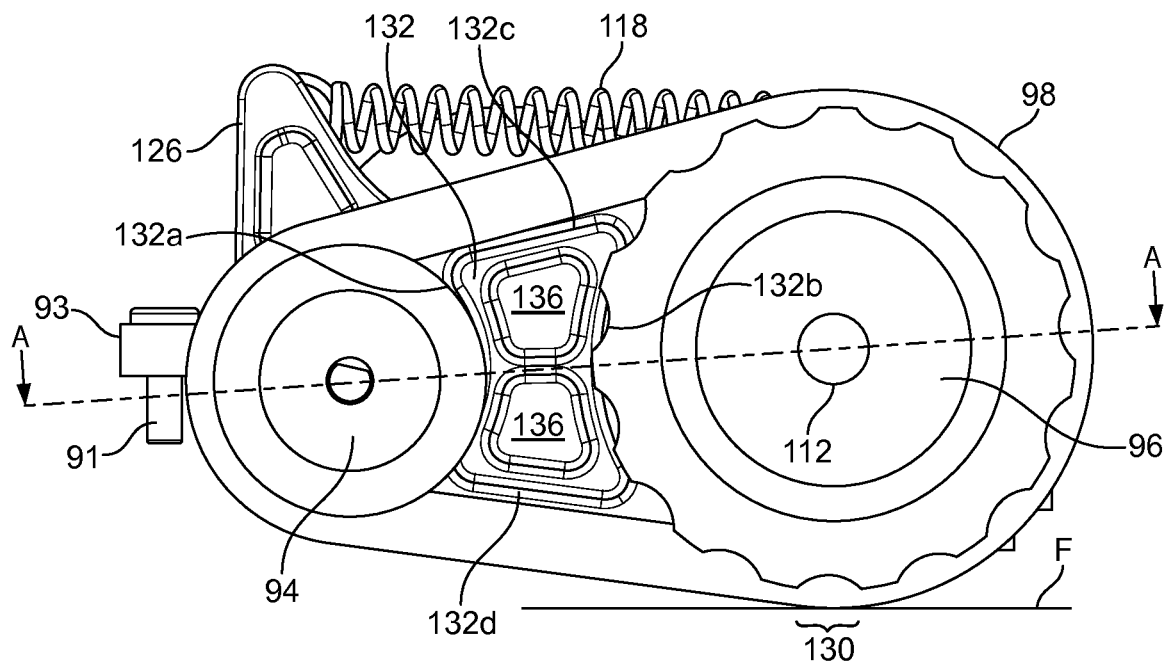
FIG. 6 is a side view of the traction unit in FIGS. 5a and 5b and it orientation relative to a surface.
Figure 7:
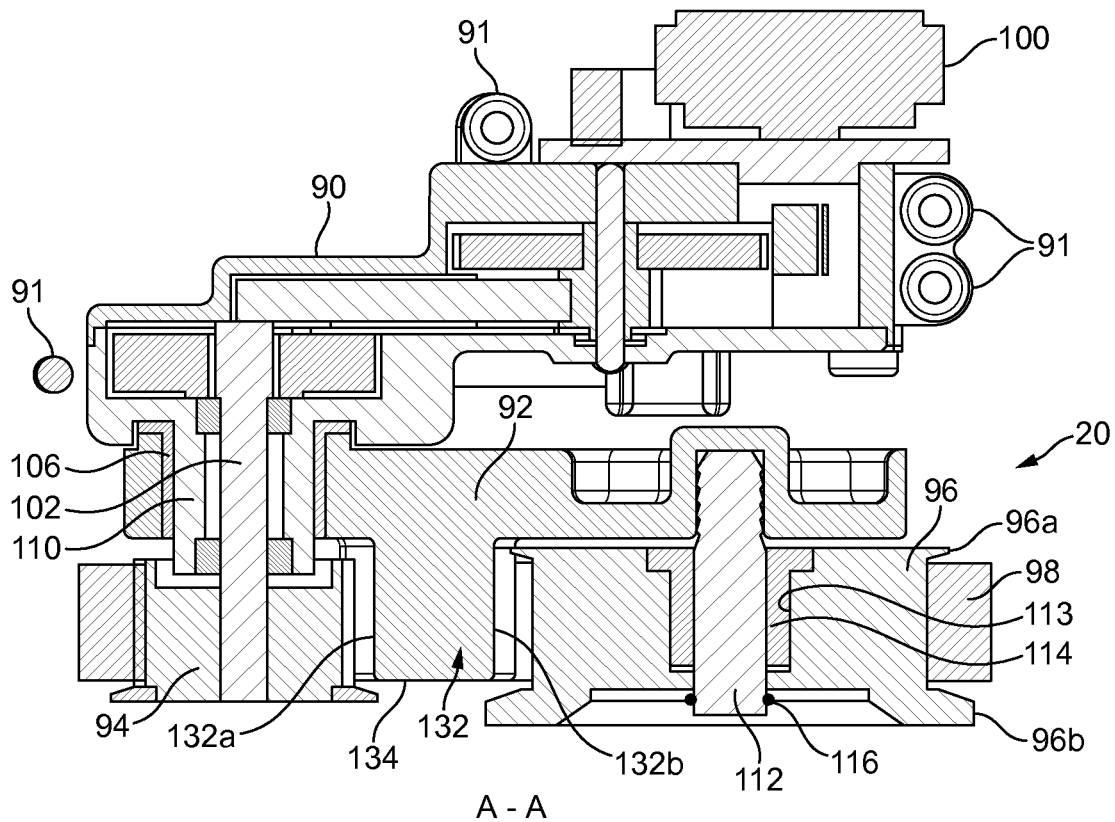
FIG. 7 is a section view of the traction unit in FIG. 6 along the line A-A.
Figure 8:
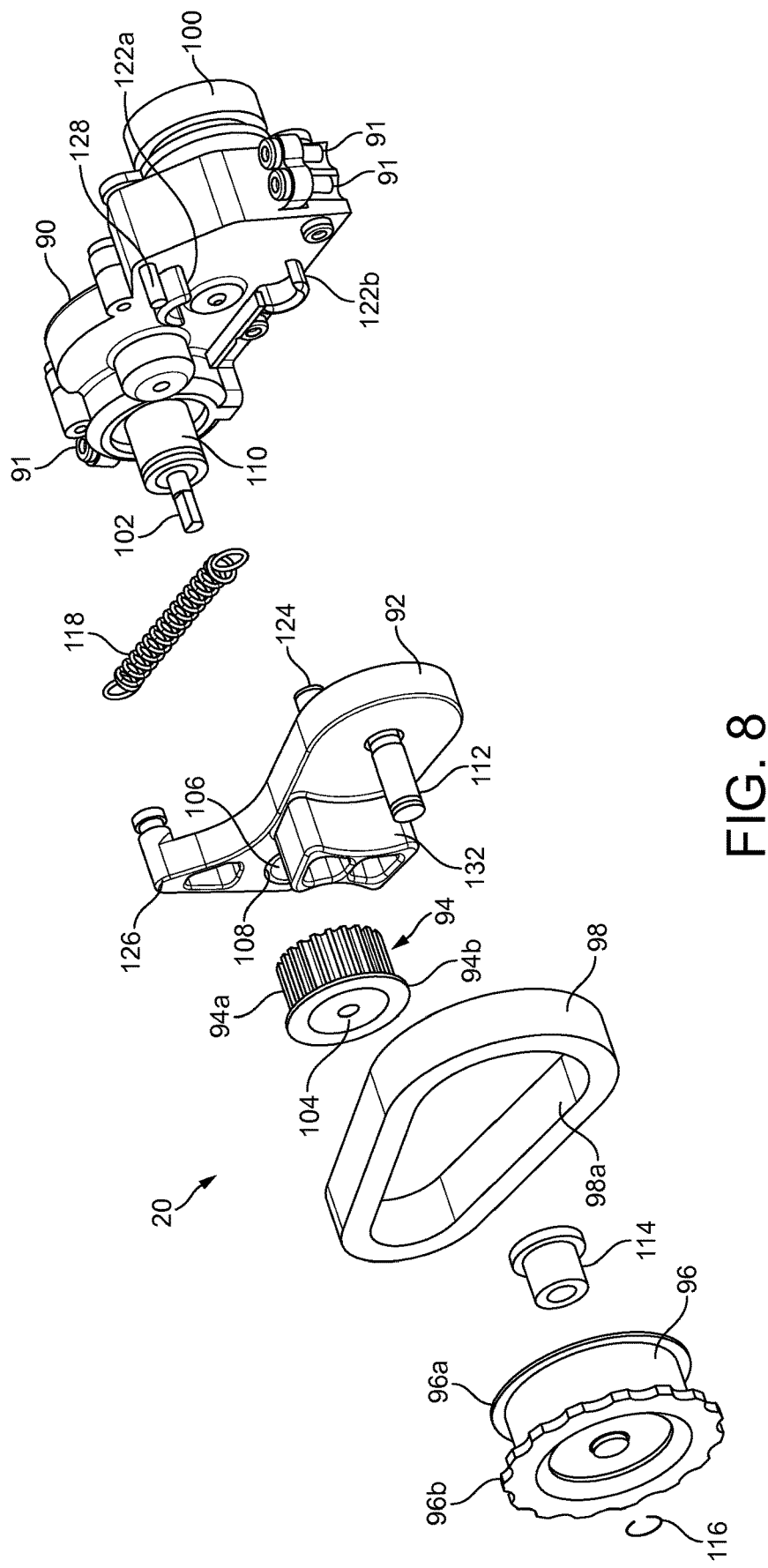
FIG. 8 is an exploded perspective view of the traction unit in FIGS. 5a, 5b and 6.

FIG. 6 shows the relative position of the wheels 94, 96 with respect to the floor surface F when the robot 2 is at rest, and in which position the swing arm 92 is at its minimum limit of travel, the pin 124 being engaged with the upper stop 122a. In this position, a portion of the track 98 around the trailing wheel 96 defines a contact patch 130 with the floor surface whereas a portion of the track 98 forward of the contact patch and extending to the leading wheel is inclined relative to the floor surface F due to the larger radius of the trailing wheel 96 compared to the leading wheel 94. This provides the traction unit 20 with a ramped climbing surface which improves the ability of the robot 2 to climb over imperfections in the floor surface, as well as over raised obstacles such as electrical cables/flexes or edges of rugs for example. It should be noted that the ramped climbing surface is provided particularly when the underside of the chassis of the robot is in an orientation parallel to the surface over which is travelling and is supported in this orientation by the plurality of rollers 31.

Although in this embodiment, the inclined track surface is largely the result of the trailing wheel 96 having a greater diameter than the leading wheel 94, it should be appreciated that a comparable result would be obtained if the wheels were of the same diameter, but the swing arm 92 was configured to be angled more steeply downward when in the minimum travel position. Also, it should be noted that although the swing arm 92 provides the trailing wheel 96 with the ability to push down on the floor surface when travelling over a variety of terrain, the inclined track surface could also be provided with the leading and trailing wheels 94, 96 in fixed positions relative to the chassis 4. To provide the inclined track, the trailing wheel could be a larger diameter than the leading wheel. Alternatively, or in addition, the centre axis of the trailing wheel could lie in a lower horizontal plane compared to the centre of the leading wheel.

In addition to the improvement in climbing ability of the inclined track 98 compared to a simple wheel, the traction unit 20 maintains a small contact patch 130 by virtue of its single trailing wheel 96 which provides a maneuvering benefit since it does not suffer the extent of slippage that would be experienced if a significant portion of the track 98 was in contact with the floor surface.

A further traction enhancement is provided by the outer lip 96b of the trailing wheel 96 which extends radially outwards further than the lip 96a on the inboard side of the wheel 96. As shown clearly in FIG. 6, the outer lip 96b extends almost to the same radius as the outer surface of the track 98 and its edge is provided with a toothed or serrated formation. A benefit of this is that, in circumstances in which the robot is travelling over a soft surface such as a rug or carpet, the track 98 will tend to sink into the pile of the carpet whereby the serrated edge of the outer lip 96b will engage the carpet and provide the robot with increased traction. However, on hard surfaces, only the track 98 will contact the floor surface which will benefit the maneuvering ability of the robot.

A still further benefit is that the track arrangement provides the climbing ability of a much larger single wheel, but without the large dimension which allows the brush bar to be positioned very near to the lateral axis of the robot which is important in providing full width cleaning. As seen in this embodiment, the rotational axis of the trailing wheel 96 is substantially in line with the lateral axis of the robot which benefits maneuverability. The cleaner head is able to be positioned very close to the traction units 20, and in this embodiment the axis of the cleaner head is spaced approximately 48 mm from the lateral axis of the robot, although it is envisaged that a spacing of up to 60 mm would be acceptable in order to minimise the amount that the cleaner head projects from the outer envelope of the main body.

In an alternative embodiment (not shown), the depth and the thickness of the outer lip 96b is increased such that the surface of the lip 96b lies side by side with the outer surface of the track 98 surrounding the trailing wheel 96, in effect providing a transverse extension of the surface of the track 98. This increases the area of the contact patch 130 also on hard surfaces which may be desirable in some circumstances. In this embodiment, it should be appreciated that the climbing ability is also retained by the inclined track surface without increasing the contact patch in the longitudinal direction of the track 98.

As has been explained, the traction units 20 of the robot 2 provide an improved ability to travel over deep pile rugs and carpets, and also to negotiate obstacles such as electrical cables lying on the floor and also small steps between floor surfaces. However, 'caterpillar' type drive units can be vulnerable to ingress of debris in the nip between the wheels and the belt. To guard against this, the swing arm 92 further includes a raised block-like portion 132 that extends outwardly from the swing arm 92 in the space bounded by the opposing parts of the leading and trailing wheels 94, 96 and the inner surface of the track 98. Side surfaces 132a, 132b, 132c, 132d of the debris guard block 132 are shaped to sit closely next to the adjacent surfaces of the wheels 94, 96 and the belt 98 whilst an outboard surface 134 of the block 132 terminates approximately in line with the outer faces of the wheels 94, 96. The block 132 is therefore shaped to accommodate substantially all of the volume between the wheels 94, 96 and so prevents debris such as grit or stones from fouling the drive arrangement. Although the block 132 could be solid, in this embodiment the block 132 includes openings 136 which reduce the weight of the spring arm 92 and also its cost. Although the block 132 preferably is integral with the swing arm 92, it could also be a separate component fixed appropriately to the swing arm, for example by clips, screws or adhesive. Optionally, the block could carry a plate member shaped like the boundary defined by the belt. This would further reduce the likelihood of dirt ingress into the drive arrangements.

Figure 10:
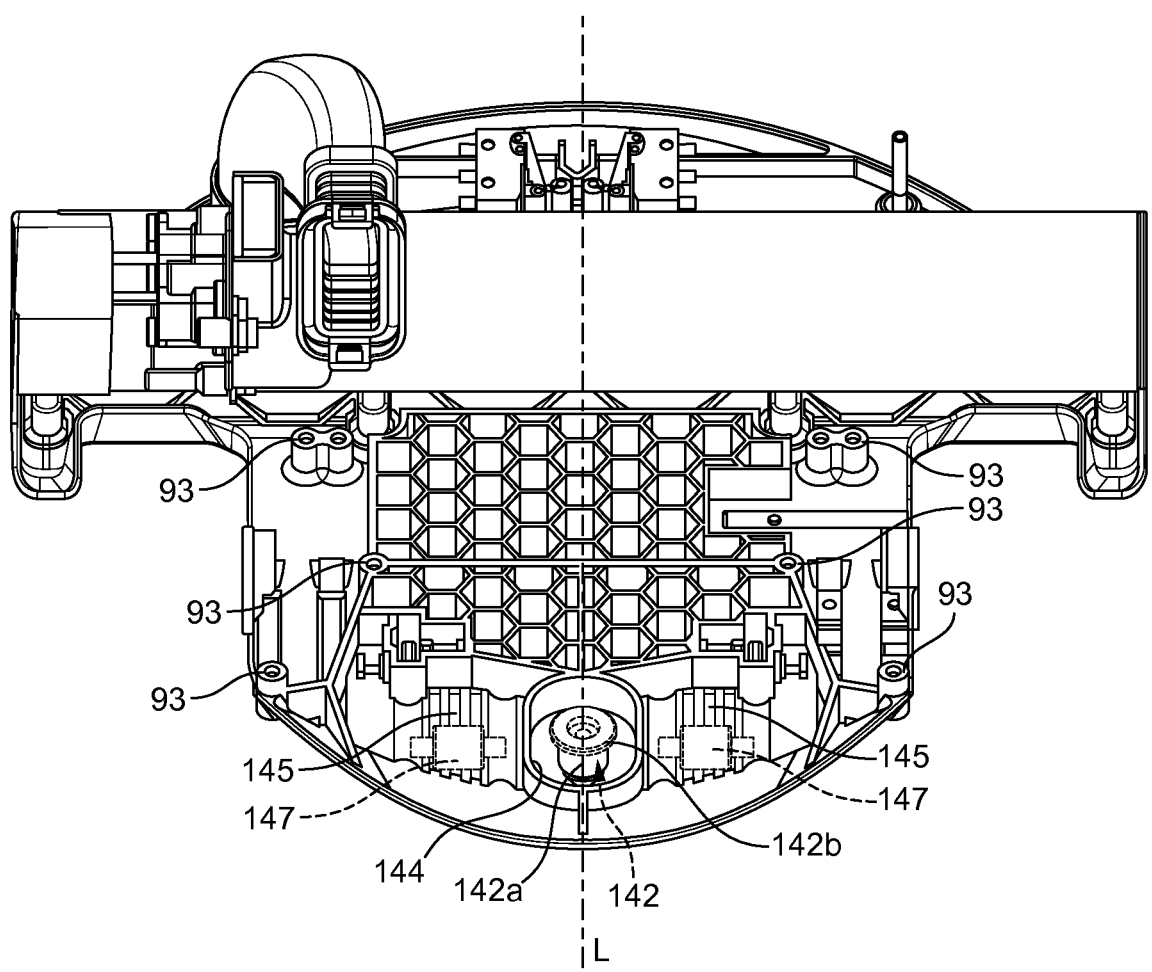
FIG. 10 is a front view of the chassis of the mobile robot.
Figure 11:
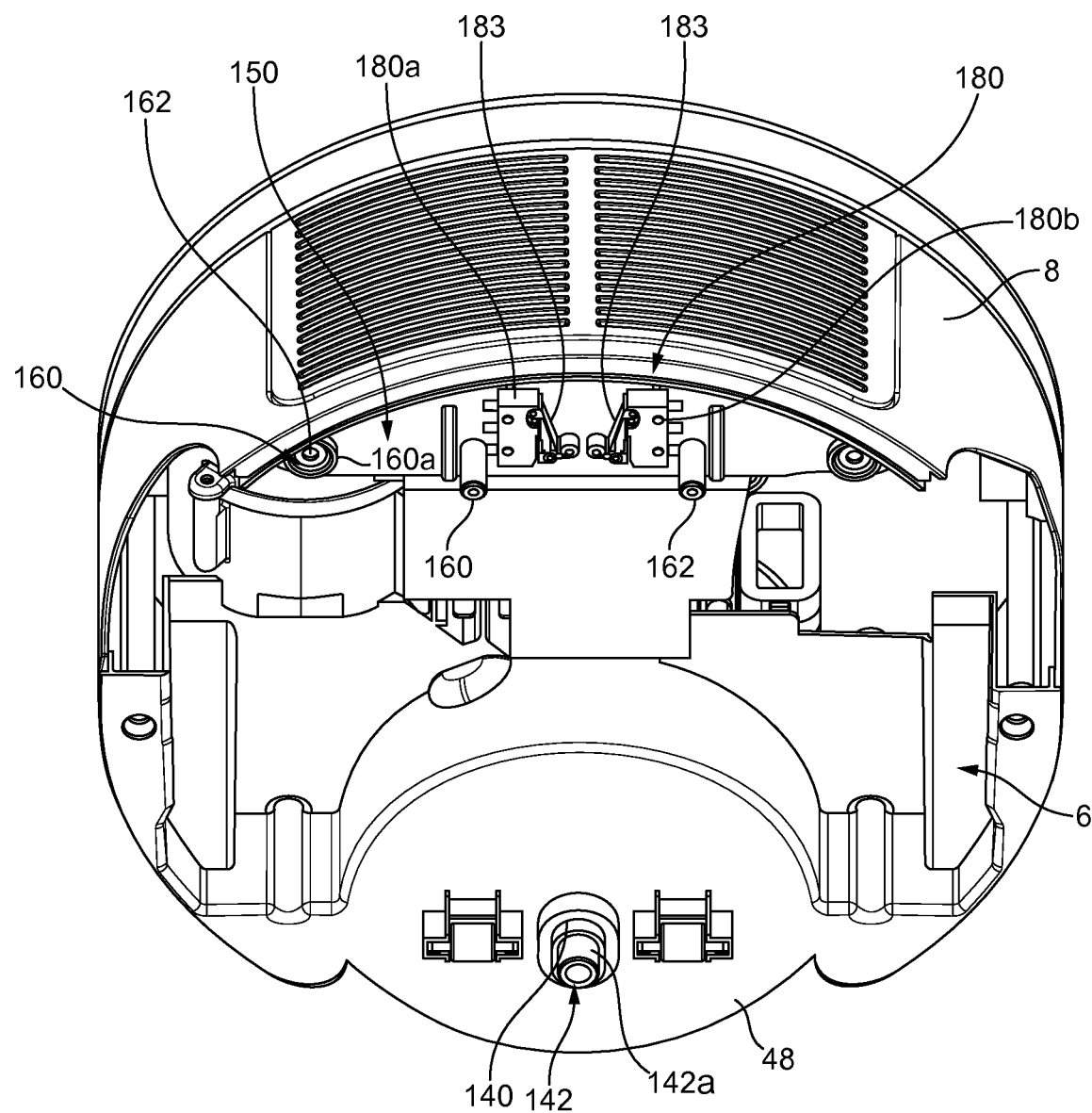
FIG. 11 is a rear view of the chassis of the mobile robot.
Figure 12:
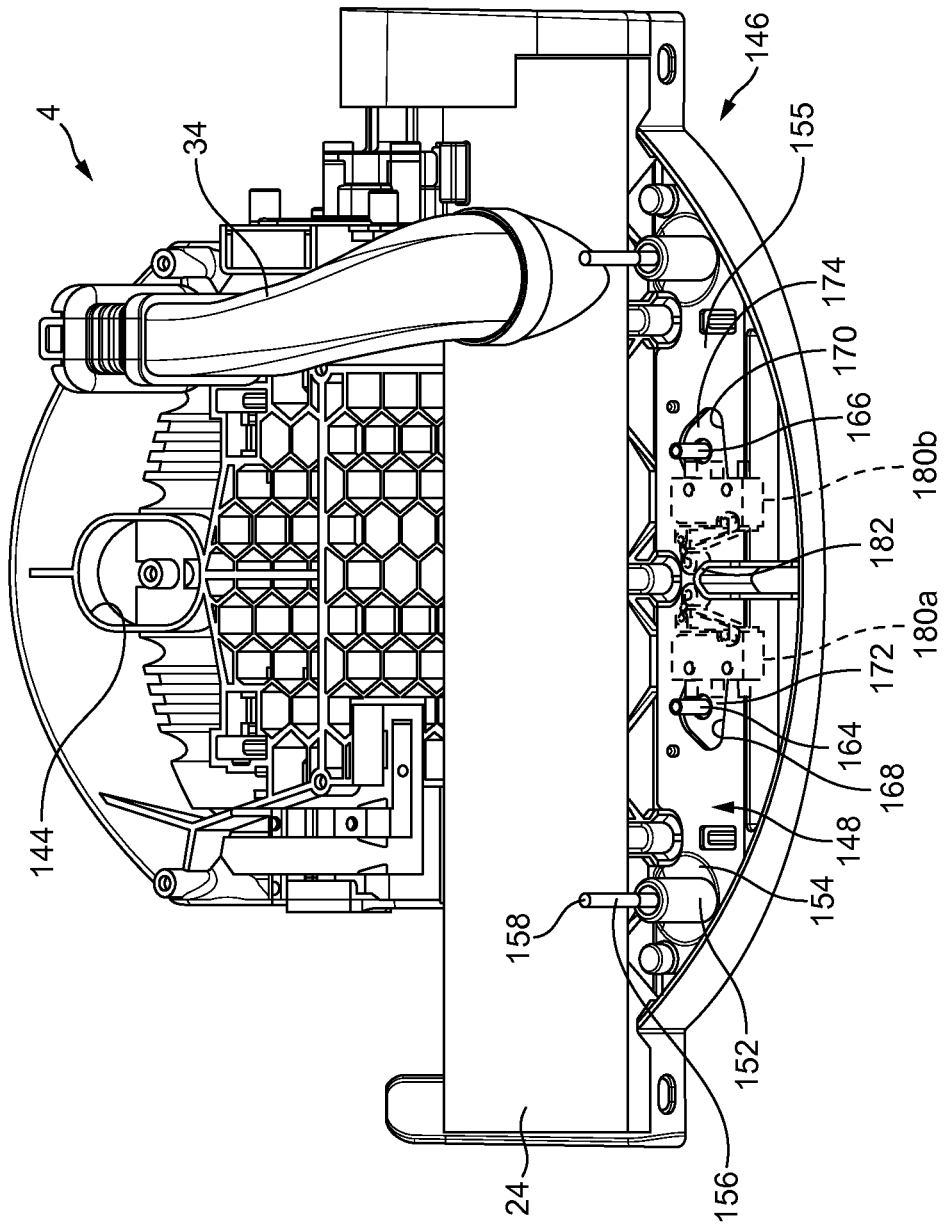
FIG. 12 is a view from underneath of the main body of the mobile robot.

Referring now to FIGS. 10, 11 and 12, these illustrate how the body 6 is attached to the chassis 4 to enable relative sliding movement between one another and how this relative moment is used by the robot 2 to gather information about collisions with objects in its path.

To enable relative sliding movement between the chassis 4 and the body 6, front and rear engagement means fix the chassis 4 and the body 6 together so that they cannot be separated in the vertical direction, that is to say in a direction normal to the longitudinal, axis L of the robot 2, but are permitted to slide with respect to one another by a small amount.

Turning firstly to the front portions of the main body, as best illustrated in FIG. 11, a front engagement means includes a centrally located elongate slot-like opening 140 shaped like an oval, a racetrack/stadium or a para-truncated circle that is defined in the front portion of the body 6, specifically in a central position in the platform 48. A slidable pivoting member in the form of a gudgeon pin 142 is received through the opening and includes a sleeve section 142a that extends a short way below the opening 140 and an upper flange 142b.

The engagement means also includes a complementary structure on the forward portion of the chassis 4 in the form of a walled-recess 144, which is also racetrack/stadium shaped to correspond to the shape of the opening 140 in the platform 48. The body 6 is mountable on the chassis 4 so that the opening 140 on the platform 140 body 6 overlies the recess 144 in the chassis 4. The gudgeon pin 142 is then secured to the floor of the recess 144 by a suitable mechanical fastener such as a screw; the gudgeon pin 142 is shown ghosted in its position in the recess 144 in FIG. 10. The body 6 is therefore joined to the chassis 4 against vertical separation. However, since the gudgeon pin 142 is fixed immovably to the chassis 4 whilst being held slidably in the opening 140, the body 6 can slide relative to the gudgeon pin 142 and can pivot angularly about it due to its rounded shape.

The forward portion of the chassis 4 also includes two channels 145, one located on either side of the recess 144, which serve as a supporting surface for respective rollers 147 provided on the underside of the body 6 and, more specifically, on the platform 48 either side of the opening 140. The rollers 147 provide support for the body 6 on the chassis 4 and promote smooth sliding movement between the two parts and are shown in ghosted form in FIG. 10.

The rear engagement means constrains movement of a rear portion 150 of the body 6 relative to the chassis 4. From a comparison between FIG. 11 and FIG. 12, it can be seen that a rear portion 146 of the chassis 4 behind the cleaner head 24 includes a bump detection means 148 which also serves as a secure mounting by which means the rear portion 150 of the body 6 is connected to the chassis 4.

Each side of the bump detection means includes a body support means; both body support means are identical and so only one will be described in detail for brevity. The body support means comprises a sleeve-like tubular supporting member 152 that sits in a dished recess 154 defined in the chassis 154. In this embodiment, the dished recess 154 is provided in a removable chassis portion in the form of a plate member 155 that is fixed across the rear portion 146 of the chassis 4. However, the recesses 154 could equally be an integral part of the chassis 4.

A spring 156 is connected to the chassis 154 at its lower end and extends through the sleeve member 152, wherein the end of the spring terminates in an eyelet 158. The sleeve 152 and the spring 156 engage with a complementary socket 160 on the underside of the body 6, which socket 160 includes a raised wall 160a with which the upper end of the sleeve 152 locates when the body 6 is mounted onto the chassis 4. When mounted in this way, the spring 156 extends into a central opening 162 in the socket 160 and the eyelet 158 is secured to a securing pin within the body 6. Note that the securing pin is not shown in the figures, but may be any pin or suitable securing point to which the spring can attach.

Since the supporting sleeve members 152 are movably mounted between the chassis 4 and the body 6, the sleeve members 152 can tilt in any direction which enables the body 6 to 'rock' linearly along the longitudinal axis 'L' of the robot, but also for the rear portion of the body 6 to swing angularly, pivoting about the gudgeon pin 142 by approximately 10 degrees as constrained by the rear engagement means as will now be explained further. In this embodiment, the springs 156 provide a self-centering force to the supporting sleeve members 152 which urge the sleeves members 152 into an upright position, this action also providing a resetting force for the bump detection system. In an alternative embodiment (not shown), the supporting sleeve members 152 could be solid, and a force to 'reset' the position of the body relative to the chassis could be provided by an alternative biasing mechanism.

Although the sleeve members 152 allow the body 6 to 'ride' on the chassis 4 with a certain amount of lateral movement, they do not securely connect the rear portion 150 of the body 6 to the chassis 4 against vertical separation. For this purpose, the bump detection means 148 includes first and second guiding members in the form of posts or rods 160, 162 provided on the body 6 which engage with respective pins 164, 166 provided on the chassis 4. As can be seen in FIG. 12, the pins 164, 166 extend through respective windows 168, 170 defined in the plate member 155 and are retained there by a respective washer 172, 174. In order to mount the rear portion 150 of the body 6 onto the rear portion 146 of the chassis 4, the guiding members 160, 162 are push fit onto the pins 164, 166 until they contact their respective washer 172, 174. The movement of the rear portion 150 of the body 6 is therefore constrained to conform to the shape of the windows 168, 170 such that the windows serves as a guiding track. In this embodiment, the windows 168, 170 are generally triangular in shape and so this will permit the body 6 to slide linearly with respect to the gudgeon pin 142 but also to swing angularly about it within the travel limits set by the windows 168, 170. However, it should be noted that the permitted movement of the body 6 can be altered by appropriate re-shaping of the windows 168, 170.

The bump detection means 148 also includes a switching means 180 to detect movement of the body 6 relative to the chassis 4. The switching means 180 includes first and second miniature snap-action switches 180a, 180b (also commonly known as 'micro switches') provided on the underside of the rear portion 150 of the body 6 that, when the body 6 is mounted to the chassis 4, are located either side of an actuator 182 provided in a central part of the rear portion 146 of the chassis 4. In this embodiment, the actuator 182 takes the form of a wedge-shape having angled leading edges for activating the switches 180a, 180b. Although not shown in the Figures, the switches 180a, 180b are interfaced with the control means of the robot. The location of the switches 180a, 180b relative to the wedge-shaped actuator 182 is shown in FIG. 12; note that the switches 180a, 180b are shown in dotted lines. As can be seen, the switches 180a, 180b are positioned such that their activating arms 183 are positioned directly adjacent and either side of the angled forward edges of the wedge-shaped actuator 182.

The switches 180a, 180b are activated in circumstances where the robot 2 collides with an obstacle when the robot is navigating around a room on cleaning task. Such a bump detection facility is desirable for an autonomous vacuum cleaner since sensing and mapping systems of such robots can be fallible and sometimes an obstacle will not be detected in time. Other robotic vacuum cleaners operate on a 'random bounce' methodology in which a means to detect a collision is essential. Therefore, a bump detection facility is needed to detect collisions so that a robot can take evasive action. For example the control means may determine simply to reverse the robot and then to resume forward movement in a different direction or, alternatively to stop forward movement, to turn 90° or 180° and then to resume forward movement once again.

Activation of the switches 180a, 180b will now be explained with reference to FIGS. 13a, 13b, 13c and 13d, which show a schematic representation of the chassis 4, body, 6 and bump detection means in different bump situations. In the following figures, the parts common with the previous figures are referred to with the same reference numerals.

Figure 13A:
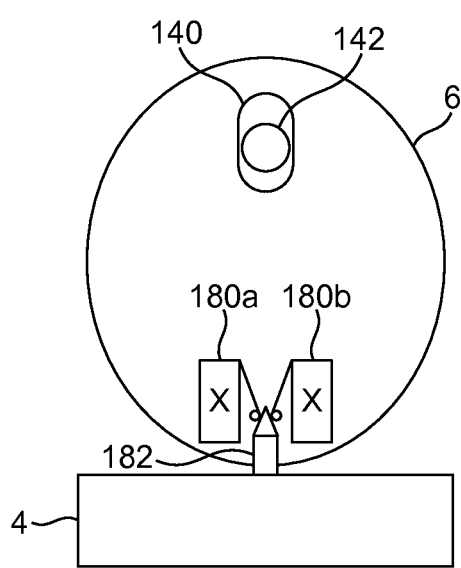
FIGS. 13a, 13b, 13c and 13d are schematic views of the robot in various 'bump' conditions.

FIG. 13a shows the relative positions of the body 6, the chassis 4, the gudgeon pin 142, the body pivot opening 140, the switches 180a, 180b and the wedge-shaped actuator 182 in a non-collision position. As can be seen, neither switch 180a, 180b has been activated as indicated by the reference 'X'.

Figure 13B:
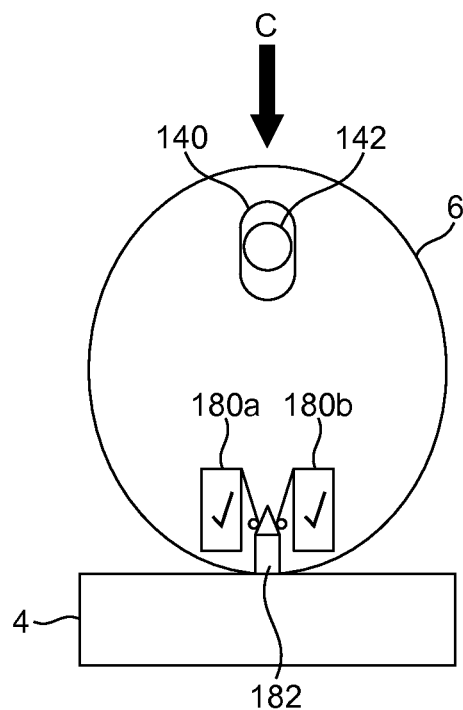

FIG. 13b shows the robot 2 in a collision with an obstacle in the 'dead ahead' position, as indicated by the arrow C. The body 6 is caused to move backward linearly, that is to say along its longitudinal axis L and, accordingly, the two switches 180a, 180b are moved backwards with respect to the wedge-shaped actuator 182 thereby triggering the switches 180a, 180b substantially at the same time as indicated by the check marks.

Figure 13C:
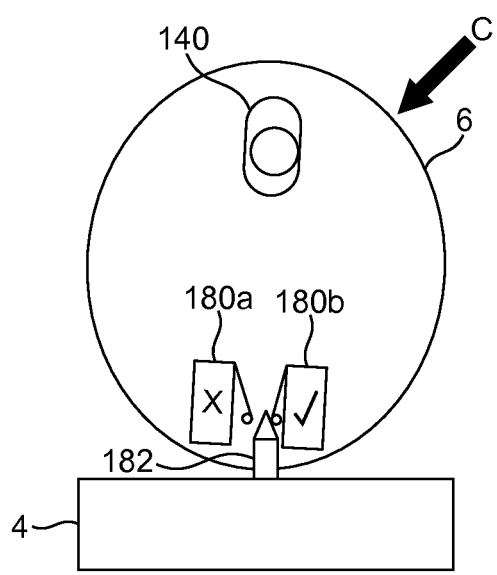

Alternatively, if the robot 2 collides with an obstacle on its right hand side, as indicated by the arrow C in FIG. 13c, the body 6 will be caused to swing about the gudgeon pin 142 to the left and, in these circumstances, the switches 180a, 180b will move to the left with respect to the actuator 182 with the result that the right hand switch 180b is activated before activation of the left hand switch 180a as indicated by the check mark for switch 180b.

Figure 13D:
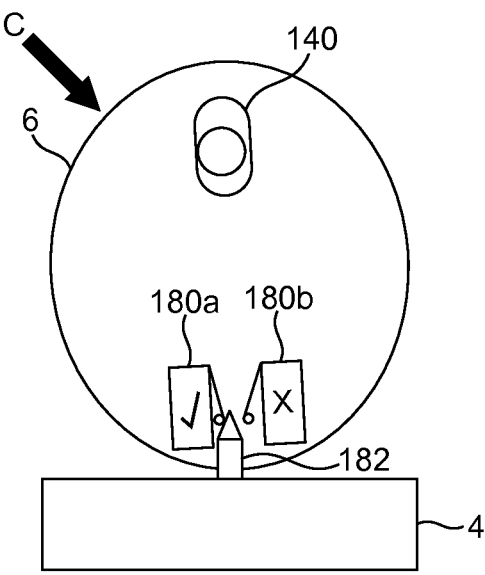

Conversely, if the robot 2 collides with an obstacle on its left hand side, as indicated by the arrow C in FIG. 13d, the body 6 will be caused to swing to the right, in which case the switches 180a, 180b will move to the right with respect to the actuator 182, which therefore triggers the left hand switch 180a before the right hand switch 180b as indicated by the check mark for switch 180a.

Although in the oblique angle collisions shown in FIGS. 13c and 13d only one of the switches 180a, 180b is shown as activated, it should be appreciated that such a collision may also activate the other one of the switches, albeit at a later time than the first activated switch.

Since the switches 180a, 180b are interfaced to the control means of the robot, the control means can discern the direction of impact by monitoring the triggering of the switches 180a, 180b, and the relative timing between triggering events of the switches.

Since the robot 2 is able to detect collisions by sensing relative linear and angular movement between the body 6 and the chassis 4, the invention avoids the need to mount a bump shell onto the front of the robot as is common with known robotic vacuum cleaners. Bump shells can be fragile and bulky so the invention increases the robustness of the robot and also makes possible a reduction in size and complexity.

Figure 14:
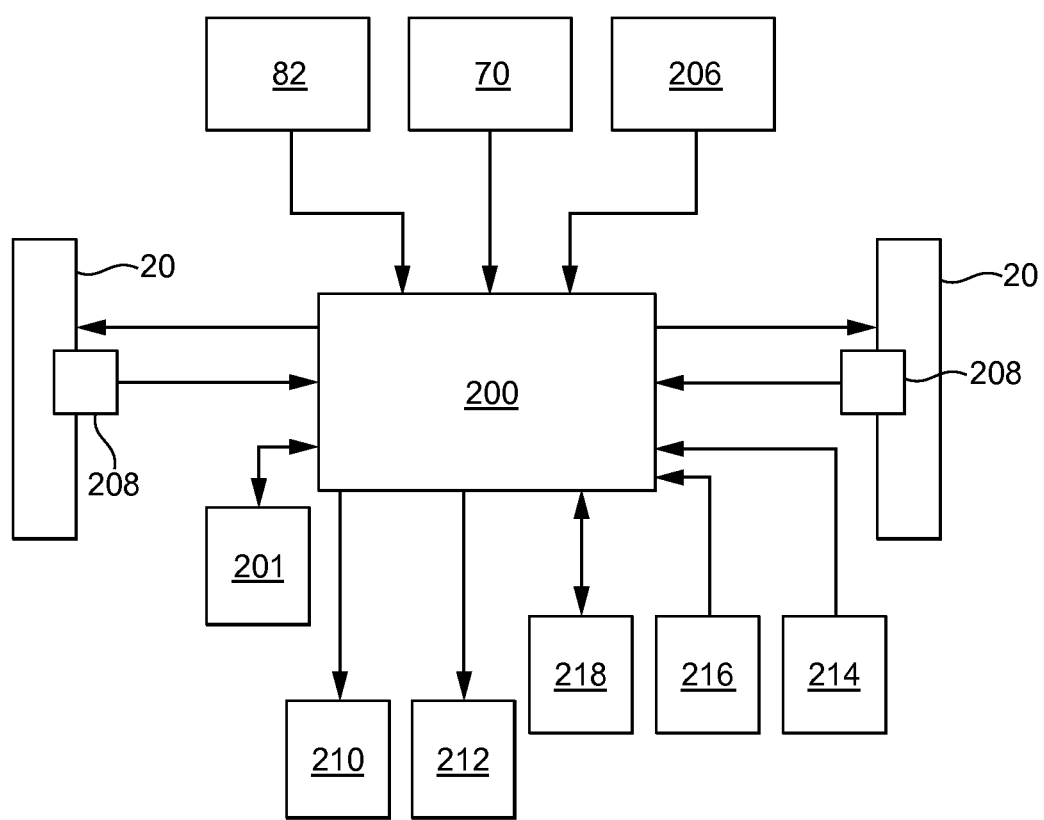
FIG. 14 is a schematic systems view of the mobile robot.

For completeness, FIG. 14 shows schematically the control means of the robot and its interfaces with the components described above. Control means in the form of a controller 200 includes appropriate control circuitry and processing functionality to process signals received from its various sensors and to drive the robot 2 in a suitable manner. The controller 200 is interfaced into the sensor suite 82 of the robot 2 by which means the robot gathers information about its immediate environment in order to map its environment and plan an optimum route for cleaning. A memory module 201 is provided for the controller to carry outs its processing functionality and it should be appreciated that the memory module 201 could alternatively be integrated into the controller 200 instead of being a separate component as shown here.

The controller 200 also has suitable inputs from the user interface 204, the bump detection means 206 and suitable rotational sensing means 208 such as rotary encoders provided on the traction units 20. Power and control inputs are provided to the traction units 20 from the controller 200 and also to the suction motor 210 and the brush bar motor 212.

Finally, a power input is provided to the controller 200 from the battery pack 214 and a charger interface 216 is provided by which means the controller 200 can carry out charging of the battery pack 214 when the battery supply voltage has dropped below a suitable threshold.

Many variations are possible without departing from the inventive concept. For example, although the traction units 20 have been described as having a continuous rubberized belt or track, the invention could also be performed with a track that comprises numerous discrete track or tread sections linked together to form a chain.

In the embodiment above, the body 6 has been described as being able to move linearly as well as angularly about the chassis. However, it should be appreciated that this is such that collisions can be detected from a wide range of angles and that the invention resides also in a bump detection system in which the body moves linearly or angularly to the chassis instead of a combination of such movement.

The sensing means has been described as comprising snap-action switches disposed either side of a wedge-shaped actuator and that such an arrangement conveniently enables the switches to be activated when the body moves linearly (both switches activated simultaneously) or angularly (one switch activated before the other). However, the skilled person will appreciate that other switch mechanisms are possible, for example contactless switches such as a light-gate switch, or a magnetic/Hall effect switch.

The invention claimed is:

1. A drive arrangement for a mobile robot comprising a transmission unit for transmitting drive from a motor unit to a drive shaft extending from the transmission unit along a drive shaft axis, a swing arm coupled to the transmission unit so as to swing angularly about the drive shaft axis throughout a rotational range between a minimum and a maximum limit, a drive sprocket mounted to the drive shaft and a driven pulley mounted on a portion of the swing arm remote from the drive shaft and being rotatable about an axis parallel to the drive shaft axis, a track constrained around the drive sprocket and the driven pulley, wherein when in use on an adjacent planar floor surface a lowest portion of the drive sprocket is raised above a lowest portion of the driven pulley such that the track always provides an inclined driving surface facing the adjacent planar floor surface throughout the rotational range of the swing arm, wherein the inclined driving surface extends between a first vertical plane extending through a rotational axis of the drive sprocket and a second vertical plane extending through a rotational axis of the driven pulley.

2. The drive arrangement of claim 1, including a single driven pulley.

3. The drive arrangement of claim 1, wherein the driven pulley has a greater diameter than the diameter of the drive sprocket.

4. The drive arrangement of claim 1, wherein the motor unit is a brushless DC electric motor.

5. The drive arrangement of claim 1, wherein the swing arm includes a guard member that at least partially fills a volume bounded by the drive sprocket, the driven pulley and the track.

6. The drive arrangement of claim 1, wherein biasing element is provided between the transmission unit and the swing arm.

7. The drive arrangement of claim 1, wherein the driven pulley includes a track engaging face and a rim portion adjacent to and having a diameter that is greater than the diameter of the track engaging surface.

8. The drive arrangement of claim 7, wherein the rim portion extends to the same radial position as the outer surface of the track.

9. The drive arrangement of claim 7, wherein the rim portion has a serrated profile.

10. The drive arrangement of claim 1, wherein the track is constrained around the outer surface of the driven pulley.

11. The drive arrangement of claim 1, comprising a first stop and a second stop arranged to delimit the rotational range of the swing arm, wherein the first stop defines a maximum limit of angular travel of the swing arm and the second stop defines a minimum limit of angular travel of the swing arm.

* * * * *